Figure 1:
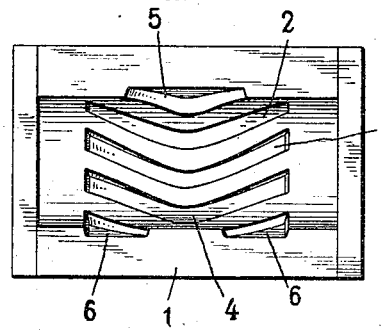

L. S. BACHE.
OILLESS BEARING.
APPLICATION FILED APR. 23, 1914.

1,122,565.

Patented Dec. 29, 1914.

WITNESSES

INVENTOR
Leigh S. Bache,
BY
ATTORNEY

UNITED STATES PATENT OFFICE.

LEIGH S. BACHE, OF BOUNDBROOK, NEW JERSEY, ASSIGNOR TO GRAPHITE LUBRICATING COMPANY, OF BOUNDBROOK, NEW JERSEY, A CORPORATION OF NEW JERSEY.

OILLESS BEARING.

1,122,565.        Specification of Letters Patent.      Patented Dec. 29, 1914.

Application filed April 23, 1914. Serial No. 833,988.

*To all whom it may concern:*

Be it known that I, LEIGH S. BACHE, a citizen of the United States, and a resident of Boundbrook, in the county of Somerset and State of New Jersey, have invented certain new and useful Improvements in Oilless Bearings, of which the following is a full, clear, and exact description, whereby any one skilled in the art may make and use the same.

The invention relates to oilless bearings or self-lubricating bearings. By the term "oilless" or "self-lubricating" is meant a bearing which has inherent qualities of lubrication due to its component parts. It might be defined more exactly as a bearing composed of metal and a substantially hard lubricating surface held in suitable pockets in the metal of the bearing which, while directly coöperating to sustain the weight of a shaft or the like, is also capable of lubricating the metal parts.

The form of bearing herein described, while applicable to shafts generally, is particularly efficacious when used in connection with an oscillatory shaft.

As hereinafter described, the bearing consists generally of a metallic part having a peculiar arrangement of retaining grooves therein, in which grooves, there is tightly compressed and vulcanized a lubricating compound preferably of graphite.

Such bearings as herein described are ordinarily of comparatively thin metal and it is desirable to provide as great a metal sustaining area as possible and at the same time, secure ample and adequate lubrication for the metal without weakening the metallic shell in which the grooves are formed.

In a co-pending application, Serial No. 825,355, filed March 17, 1914, I have illustrated a form of spring bearing having certain features of advantage and in which the grooves for retaining the lubricant are of spiral form extending in a slightly transverse direction though generally along the line of the axis of the bearing. In such application, I have set forth the advantages of an arrangement in which the alternate grooves are cut away at one side to provide a substantially wide opening so that there is a broader face of lubricant at the contact surface of the bearing than at the bottom of the retaining grooves. This heretofore described arrangement is most efficient, but, obviously, if a long bearing is employed and the line of the spirally formed groove is continued, it would extend across the axis of the bearing to such an extent that the cores cannot be drawn in casting and furthermore, the lubricating surface will not be properly disposed to give the maximum lubricating qualities.

In order to secure the same advantages set forth in my co-pending application and to provide for bearings of any given length, I arrange the grooves of the metal shell in what might be termed a "herring-bone" formation. As hereinafter described and illustrated, the grooves are formed longitudinally of the bearing and reversing in direction at intervals from end to end thereof so that the grooves at the ends of the bearings are in substantially the same elemental lines which lie parallel with the axis of the bearing.

The alternate grooves are relieved at one side so that a substantially wide lubricating surface is provided. The grooves may be readily cast in the metal in as much as the cores may be perfectly drawn and there is a maximum of metallic support and a maximum of lubricating surface provided to sustain the unusual strains of an oscillatory shaft or a rotating shaft.

Figure 2:
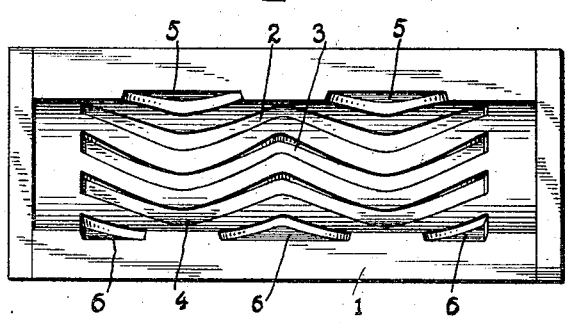
Figure 3:
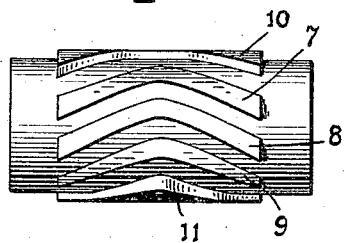
Figure 4:
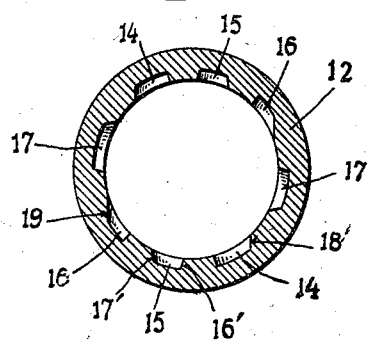
Figure 5:
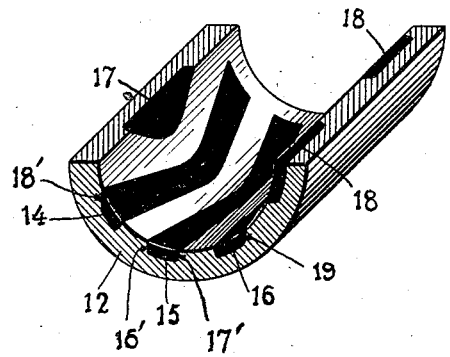
Figure 6:
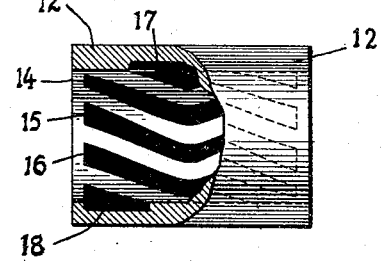

In the accompanying drawings Figure 1 is a plan view of one section of a core-box which illustrates the formation of the grooves. Fig. 2 is a similar view of a core-box showing a duplication of the reversal of direction of grooves for a long bearing. Fig. 3 is a plan view of a core. Fig. 4 is a sectional view through the bearing formed by the core. Fig. 5 is a sectional view of the bearing in perspective. Fig. 6 is a plan view with parts broken away to illustrate the direction of the grooves in the upper and lower halves of the bearing.

In forming the bearings herein described, the core-box section is used to produce the lower half of the core as well as the upper half and when the two halves of the core have been formed, they are placed together in such manner that the herringbone ribs or extensions upon the core run in parallel direction to each other about the entire core. The apexes of the herring-bone extensions lie in the same circumferential line. Obviously, the herring-bones in one section may be reversed in direction with reference to the other by changing the position of one core section with reference to its coöperating section.

Referring to the drawings, the numeral 1 denotes one section of a core-box having a series of herring-bone grooves 2, 3, 4 and portions of grooves 5 and 6 which provide a complete core as illustrated in Fig. 3 having corresponding projecting ribs of herring-bone form 7, 8, 9, 10 and 11. As illustrated in Figs. 1, 3, 4, 5 and 6, the grooves extend along the bearing in a curve of substantially spiral form to the center of the bearing and then reverse their direction thus forming the herring-bone grooves of the bearing.

In Fig. 2, there is illustrated a core-box for producing a duplication of these herring-bone formations, this being an especially useful form where unusually long bearings are used. In fact, the reverse direction of the grooves may be repeated as often as desirable along the length of the bearing as its length is increased and thus the curvature of any of the grooves will never run about the bearing sufficiently to interfere with the main object of the invention which is to provide the alternate grooves with extended surfaces relieving them at one side. When the core illustrated in Fig. 3 is used in the mold, it produces a bearing shell such as illustrated in Figs. 4, 5 and 6 in which the metallic shell 12, substantially of cylindrical form has arranged within it and stopping just short of its extreme ends, a series of grooves 14, 15, 16, 17, and 18 corresponding to the herring-bone ribs of the core. These grooves are so formed that the bottom groove 15 has substantially straight walls 16', 17' with just sufficient bevel to permit the proper draft in molding, while the grooves on either side as 14, 16 have one side of their walls 18', 19 cut away or relieved to give perfect draft in molding. The walls 18', 19 are nearly perpendicular from end to end. There is thus provided a groove 15 having a definite width at its bottom and the grooves 14, 16 have the same width at the bottom but due to the relief of the side walls, expose a larger surface of graphite than the groove 15. There are thus formed pockets having a maximum depth of lubricant at one side and with a gradually tapering body of graphite at the other. The deepest portion of the grooves is upon the advanced side of the herring-bone and when the bearing is used with an oscillatory shaft, this arrangement provides for an even distribution of the lubricant as there is a tendency for the graphite to be wiped off from the beveled side when moving in one direction and wiped directly into the groove and compacted at the deepest body of the graphite when it moves in the opposite direction.

The use of the herring-bone groove as defined extending along the axis of the bearing permits the use of bearings of any desired length and the herring-bone formation has a further advantage of always tending to work the graphite lubricant toward the center of the bearing as it tends to work along the herring-bone grooves toward and away from the center thereof as the shaft is oscillated or rotated. With this arrangement, a maximum strength is given to the shell and a maximum lubricating surface is provided. The main weight is obviously sustained by the metal on opposite sides of the central groove 15 and the beveled walls of the grooves 18', 19 afford a maximum strength and depth of metal at radial points through the bearing on either side of said grooves. This provides a maximum strength and backing for the graphite packing.

I am aware that herring-bone grooves have been employed in bearings of this character heretofore but so far as known to me, the herring-bones have been formed by reversing the direction of a spiral groove each 90° about the inner surface of the bearing. As herein described, the herring-bones lie along the axis of the bearing with their advancing points in substantially the same peripheral line.

Obviously, the number of herring-bone grooves and their particular form of arrangement may be modified to suit any particular length of bearing desired, so long as said grooves extend along the axis of the bearing.

What I claim as my invention and desire to secure by Letters Patent is:

1. A bearing shell having herring-bone grooves, the alternate grooves being cut away at one side to provide a wide opening and a lubricant filling said grooves.

2. A bearing shell having herring-bone grooves arranged in extension one of the other, the alternate grooves being cut away at one side to provide a substantially wide opening for a lubricant and a lubricant filling said grooves.

3. A bearing shell having a series of herring-bone grooves of substantially uniform depth and width at their bottom and with the alternate grooves cut away to provide a beveled wall and an opening of greater area than the area of the intermediate grooves and a lubricant filling said grooves.

4. A bearing shell having herring-bone grooves extending along the axis thereof and with their advancing sides arranged in substantially the same peripheral line and a lubricant filling said grooves.

5. A bearing shell having herring-bone grooves terminating within the ends of the bearing shell, the advancing side of said herring-bones lying in the same peripheral line and a lubricant filling said grooves.

6. A bearing shell having herring-bone grooves terminating within the ends of the bearing shell, the advancing side of said herring-bones lying in the same peripheral line and with the alternate grooves having wider openings than the intermediate grooves to provide lubricating pockets of uniform depth on one side and gradually tapering depth on the opposite sides and a lubricant filling said grooves.

LEIGH S. BACHE.

Witnesses:
S. A. KING,
F. M. EVANS.